Patented Feb. 27, 1940

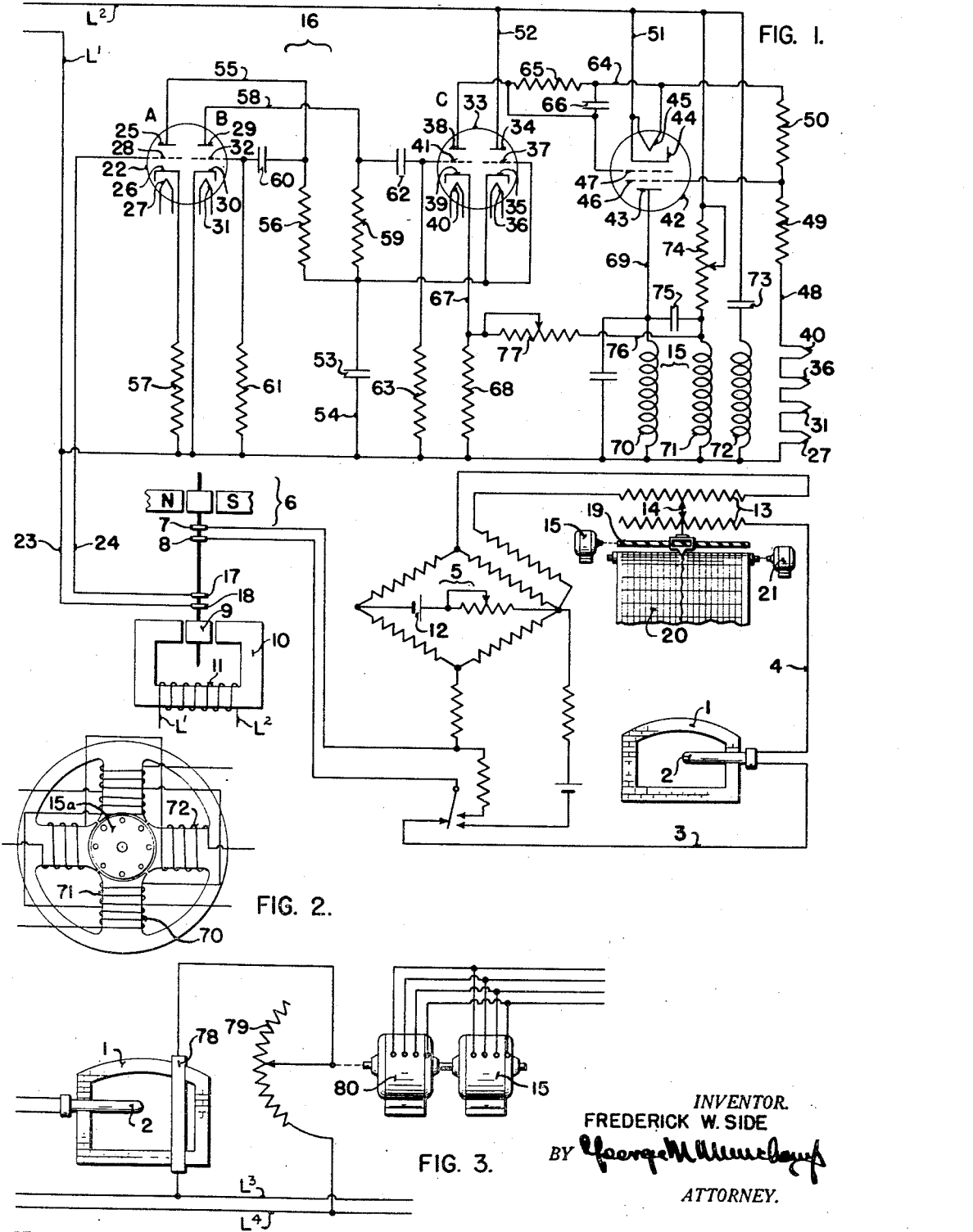

2,191,997

UNITED STATES PATENT OFFICE 2,191,997

MEASURING AND CONTROL APPARATUS

Frederick W. Side, Philadelphia, Pa., assignor to The Brown Instrument Company, Philadelphia, Pa., a corporation of Pennsylvania Application September 24, 1938, Serial No. 231,567

16 Claims. (Cl. 172—239)

The present invention relates to improvements in automatic recording and control systems and apparatus therefor.

More specifically the invention relates to systems and apparatus for determining the magnitude or changes in magnitude of a measured condition, such as mechanical, chemical, electrical, physical, etc., and including suitable provisions for making a record of the changes and/or for maintaining said measured condition at a predetermined value. The invention is especially useful in pyrometric recording and control systems where it is desired to record and control the conditions of temperature at one or more remote points, for example in furnaces or kilns.

In accordance with my invention, upon change in magnitude of a measured condition, a normally balanced electrical network becomes unbalanced and initiates operation of a driving system for effecting a rebalancing adjustment of the network, and during the rebalancing operation an additional effect is produced which jointly with the unbalance of the network controls the driving system to obtain rebalance in a minimum of time without over-shooting. Such provisions for preventing over-shooting of the balance point of the network are desirable since the inertia of the various mechanically connected parts tend to so operate as to carry the driving system and associated rebalancing means beyond the proper position of rebalance. When such a condition of over-shooting prevails, the network then becomes unbalanced in the opposite direction and initiates operation of the driving system to obtain rebalance but again the necessary regulation is exceeded to thereby set up a continuous hunting of the driving system about the balance point.

The need for such "anti-hunting" provisions in recording and controlling apparatus has long been recognized and various methods have been proposed heretofore for obtaining the same. One such prior art method for preventing hunting is disclosed in Patent 1,827,520 issued to Thomas R. Harrison on October 13, 1931, for Recording and control system and apparatus therefor, in which the speed of rebalance of an electrical network is effected in accordance with extent of unbalance thereof, and mechanically moving means are provided for anticipating the true balance position. In one other prior art method means are provided in the form of a generator driven by the driving system for obtaining an electromotive force proportional to the speed of the driving system. This electromotive force is introduced into the measuring or detector circuit in opposition to the unbalance electromotive force of the condition responsive network and operates to produce a condition of simulated rebalance of said network before the latter is actually rebalanced to thereby anticipate the true balance position of the network. As a result the driving system is slowed down before the balance position is reached and then gradually eases into said balance position without exceeding that position.

A specific object of my present invention is to provide anti-hunting means for use in recording and controlling apparatus in which an electromotive force proportional to the speed of rebalancing of the measuring network is obtained without requiring the use of a generator or other physically moving device additional to the rebalancing motive means.

A further object of the invention is to provide a measuring and/or controlling system which is characterized by its compactness, simplicity, and effectiveness, and which may be operated from a commercial alternating current supply source without the use of transformers and power rectifiers.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawing:

Fig. 1 is a diagrammatic illustration of a self-balancing potentiometric network utilizing the invention;

Fig. 2 illustrates in detail the reversible electrical motor employed in the arrangement of Fig. 1; and Fig. 3 is a diagrammatic illustration of the use of the invention in a control system.

In Fig. 1 of the drawing, an arrangement including an electronic device to be described is illustrated for producing effects in accordance with the extent of unbalance of a potentiometric network which controls the electronic device and is unbalanced in accordance with variations in a quantity to be measured, and in which because of the small magnitude of the unbalanced electromotive forces produced in the network, it is not practical nor desirable to have the said effects directly produced by the potentiometric network.

More specifically, an arrangement is illustrated in Fig. 1 for measuring and recording the temperature of a furnace 1 in the interior of which a thermocouple 2 is inserted and is responsive to slight changes in the temperature therein. The terminals of the thermocouple are connected by conductors 3 and 4 to the terminals of a null point potentiometric network 5 which may be of any suitable type such as the Brown potentiometric network disclosed in the Harrison Patent 1,898,124 issued February 21, 1933.

The moving coil of a galvanometer 6 is connected in the conductor 3 by means of pigtails or slip rings 7 and 8 and a pick-up coil 9 which is positioned in an alternating magnetic field is connected to the pivot of the galvanometer coil and is arranged to be rotated therewith. This pick-up coil is positioned between the poles of a suitable field structure 10 on which is wound a field winding 11 which is energized from alternating current supply conductors $L^1$, $L^2$ and is so arranged with respect to the poles of the field structure 10 that when the galvanometer moving coil is in its undeflected position, the pick-up coil is in zero inductive relation to the alternating magnetic field set up in the field structure. When the galvanometer moving coil deflects in one direction or the other, the pick-up coil deflects accordingly and as a result, an alternating voltage, in phase with or 180° out of phase with the line voltage, will be induced in the pick-up coil. The potentiometer network 5 is of a well-known type and it is sufficient for the present purposes to know that the potentiometer network includes a circuit branch including the thermocouple 2 and an opposing circuit branch including a source of known potential such as a battery 12, resistances 13, a variable portion of which may be connected into the opposed branches by means of a sliding contact 14 whereby the respective effects of the variable and known sources are made equal and opposite and the galvanometer moving coil is then rendered undeflected when the circuit is balanced for a given value of the E. M. F. of the thermocouple 2 with contact 14 in a corresponding position along resistances 13. The position of the contact 14 is then a measure of the value of the thermocouple E. M. F. and may serve as a measure of the temperature to which it is exposed.

This form of my invention is concerned with the means by which the contact 14 is adjusted back and forth along resistances 13 in response to galvanometer deflection and as shown includes a reversible motor 15 which is adapted to be selectively energized for rotation in one direction or the other from an electronic amplifier 16. When the thermocouple voltage changes, the galvanometer moving coil will be deflected in one direction or the other and thereby the pick-up coil 9 will be rotated into inductive relation with the alternating magnetic field set up by the field structure 10 resulting in the induction of an alternating voltage in the pick-up coil. The phase and amplitude of the alternating voltage so induced is determined by the direction and extent of deflection respectively. This induced alternating voltage is connected through suitable pigtails or slip rings 17 and 18 to the input terminals of amplifier 16 so that depending upon the direction of galvanometer deflection, the motor 15 will be energized for rotation in a corresponding direction to effect an adjustment of the sliding contact 14 along resistances 13 to rebalance the potentiometric circuit.

The shaft of motor 15 is connected in any convenient manner to a screw shaft 19 and the potentiometer contact 14 is mounted on a carriage carried by shaft 19 and is adapted to be moved in one direction or the other as the shaft 19 is rotated. Thus when the motor 15 is energized for rotation as a result of change in the thermocouple E. M. F., the motor will effect an adjusting movement of contact 14 along resistances 13 in the proper direction until the potentiometer circuit is again balanced. The galvanometer deflection will then be reduced to zero and the motor will come to rest with the contact 14 at a new position along resistances 13, which position will then be a measure of the temperature of the interior of furnace 1.

If desired, a pen may be mounted on the carriage which carries the potentiometer contact 14 and arranged in cooperative relation with a recorder chart 20 to thereby provide a continuous record of the temperature of the interior of furnace 1. The chart 20 may be a strip chart as shown and is adapted to be driven in any convenient manner as for example by a unidirectional motor 21 through suitable gearing (not shown) so that a record of the temperature to which the thermocouple 2 is subjected will be recorded as a continuous line on the chart.

The electronic amplifier 16 referred to includes an electronic valve 22 which, as shown, is a twin amplifier type including two triodes in one envelope. The voltage induced in the pick-up coil 9 as a result of galvanometer deflection is impressed by conductors 23 and 24 on the input circuit of one of the triodes of valve 22. For convenience in describing the circuit connections of amplifier 16, this triode will be referred to hereinafter as the triode A and the second-mentioned triode will be referred to as the triode B. The triode A includes an anode 25, cathode 26 and heater filament 27 and a control grid 28 and the triode B includes an anode 29, cathode 30, a heater filament 31 and a control grid 32.

Energizing current is supplied heater filaments 27 and 31 through a circuit which includes the heater filaments 36 and 40 of a twin type electronic valve 33 and the heater filament 45 of an electronic valve 42 and may be traced from the supply conductor $L^1$ to the heater filaments 27, 31, 36, 40, a conductor 48 in which a pair of resistances 49 and 50 are inserted, the heater filament 45, a conductor 51, and the supply conductor $L^2$. One triode section of valve 33 includes an anode 34, a cathode 35, the heater filament 36, and a control grid 37 which as shown is connected directly to the cathode 35, and the other triode section includes an anode 38, a cathode 39, the heater filament 40, and a control grid 41.

Direct current anode voltage is supplied both triode sections of valve 22 through a circuit which utilizes the rectifying action of one triode section of valve 33 and which may be traced from the supply conductor $L^2$ to a conductor 52, the anode 34 and cathode 35 of valve 33, to one terminal of a condenser 53 which constitutes the positive side of a half wave rectifying unit. The negative terminal of condenser 53 is connected by a conductor 54 to the supply conductor $L^1$ and as will be apparent, the condenser 53 operates to smooth out the pulsations in the rectified current flow through the circuit including the anode 34 and cathode 35 of valve 33 which impresses a definite constant voltage across its terminals.

As illustrated, the anode 25 of triode A is connected to the positive terminal of condenser 53 through a conductor 55 and a resistance 56 and the cathode 26 is connected to the negative terminal thereof through a biasing resistance 57. Similarly, the anode 29 of triode B is connected through a conductor 58 and a resistance 59 to the positive terminal of the condenser 53 and the cathode 30 is connected directly to the negative terminal of the condenser.

The output circuit of triode A is resistance capacity coupled by a condenser 60 and a resistance 61 to the input circuit of the triode B and the output circuit of triode B is resistance capacity coupled by a condenser 62 and a resistance 63 to the input circuit of the triode section of valve 33 which includes the anode 38. The latter triode section will for convenience be hereinafter designated by the reference numeral C. Anode voltage is supplied the triode section C directly from the alternating current supply conductors L¹ and L² through a circuit which may be traced from the supply conductor L² to conductor 51, heater filament 45 of valve 42, a conductor 64 in which a resistance 65 shunted by a condenser 66 is inserted, anode 38, cathode 39, and a conductor 67, in which a biasing resistance 68 is inserted, to the supply conductor L¹. Condenser 66 connected across resistance 65 is employed for smoothing out the pulsating current flows through resistance 65 so that when an alternating potential in phase with the supply line voltage is impressed between the control grid 41 and cathode 39 of valve 33, the potential drop across resistance 65 will gradually increase in value until a condition of equilibrium is reached, and when an alternating potential 180° out of phase with the supply line voltage is impressed between the control grid 41 and cathode 39, the potential drop across resistance 65 will gradually decrease in value. Thus a direct current potential will be maintained across resistance 65 which potential varies in magnitude in accordance with the phase and magnitude of an alternating signal impressed on the input circuit of amplifier 16 by the pick-up coil 9.

In operation, when an alternating voltage is applied to the input circuit of triode A, the latter will be alternately rendered conductive and non-conductive and accordingly, a pulsating potential drop will be produced across resistance 56 to alternately raise and lower the potential of the control grid 32 of triode B relatively to the cathode 30. Triode B will then be alternately rendered non-conductive and conductive to produce a pulsating potential drop across resistance 59 and thereby to alternately raise and lower the potential of control grid 41 of valve 33 relatively to cathode 39. Depending upon the phase relation of the pulsating potential applied to the control grid 41 with respect to the alternating voltage impressed on the anode 38, that is, depending upon whether the two voltages are in phase or 180° out of phase, the triode C will be rendered more conductive or less conductive during the half cycles when the anode 38 is positive and the potential drop across resistance 65 will be varied to a corresponding extent. Due to the action of condenser 66, however, the potential drop across resistance 65 will not have a pulsating characteristic but will gradually rise when an alternating potential in phase with the supply line voltage is applied to the control grid 41 of valve 33 and gradually fall when an alternating potential 180° out of phase with the supply line voltage is applied to the control grid 41.

As illustrated, the negative end of resistance 65 is connected to the control grid 47 of valve 42 and the anode circuit of the latter is connected across the alternating current supply conductors in an inverted position with respect to the connection thereacross of the anode circuit of the triode C. The anode circuit of valve 42 may be traced from the supply line L² to conductor 51, cathode 44, anode 43, and a conductor 69 to one terminal of the phase winding 70 of motor 15 and thereacross to the supply line L¹. Valve 42 also includes a screen grid 46 which is connected to a point in the network which is at a suitable potential and as shown may be connected to the point of connection of resistances 49 and 50. It will thus be seen valve 42 is arranged to be energized directly from the alternating current supply lines L¹ and L² and that the pulsating current conducted by this valve is adapted to be varied in accordance with the magnitude of the direct current potential maintained across resistance 65.

The reversible motor 15 is of the induction variety and as shown in Fig. 2, includes three windings, namely, the winding 70, a winding 71, and a winding 72. As shown in Fig. 2, motor 15 includes a squirrel cage rotor 15a and two pairs of oppositely disposed field poles. Winding 72 is wound on one pair of said field poles and windings 70 and 71 are wound on the other pair of poles, one half of winding 70 being wound on a portion of one of the field poles which is adjacent the rotor 15a and the other half being wound on a portion of the other field pole remote from said rotor. Similarly, one half of winding 71 is wound on a portion of the last mentioned pole which is adjacent the rotor 15a and the other half of winding 71 is wound on a portion of the first mentioned pole remote from said rotor.

As illustrated, winding 72 is connected to the supply conductors L¹ and L² through a suitable condenser 73 so that the current which flows through this winding will lead the line current by approximately 90°. Winding 70 is energized by the current flow conducted by valve 42 and the third winding 71 is energized from the alternating current supply conductors through an adjustable resistance 74. A condenser 75 is connected between the anode 43 of valve 42 and the point of connection of winding 71 with the resistance 74. Windings 70 and 71 are so wound on motor 15 with respect to the manner in which winding 72 is wound thereon that when they are equally energized, motor 15 will not be actuated for rotation in either direction but will remain stationary, but when one winding is energized to a greater extent than the other, the motor will be actuated for rotation in a corresponding direction. That is to say, when the anode to cathode resistance of valve 42 is approximately equal to the adjusted value of resistance 74, the torque developed by winding 70 for producing rotation of motor 15 will be equal and opposite to the torque developed by the winding 71 and consequently the motor will remain stationary. When the anode to cathode resistance of valve 42 is increased or decreased, however, the torque developed by winding 71 will increase and decrease, respectively, and the motor rotor will be actuated for rotation in a corresponding direction.

In order that the speed of motor 15 may be as great as possible during rebalancing without overshooting of the new balance point of the potentiometric network 5 and consequent hunting taking place, means have been provided to insure that the motor speed and rate of change of its speed is substantially proportional to the extent of unbalance. This result is obtained by introducing into the network a voltage whose magnitude is a function of the motor speed and whose phase is determined by the direction of rotation thereof.

This damping feature, although obtained electrically herein, is substantially the same as that disclosed in the Harrison Patent 1,827,520 mentioned hereinbefore in which the rate of rebalance of a potentiometer measuring circuit and an arresting of the motive means when the rebalancing movement has been proportional to the unbalance are controlled by mechanical means. Thus, as the sliding contact 14 approaches its new balance position, the potentiometer unbalance will be reduced and if the motor speed is then such that it will ordinarily coast beyond the balance position due to its inertia, the opposing voltage which is introduced into the network will be appreciably greater than the voltage impressed on the amplifier input circuit by the pick-up coil 9 and will tend to effect energization of the motor in the opposite direction and thereby produces a positive damping action which will check the motor speed before the balance position is reached and gradually reduce it to zero as the unbalance is reduced to zero.

Specifically, the means provided for obtaining such an anti-hunting effect includes a conductor 76 which connects the point of engagement of winding 71 and resistance 74 with the cathode 39 of valve 33. A resistance 77 is desirably inserted in conductor 76 and as will be explained further hereinafter, this connection impresses a biasing electromotive force across resistance 68 in the cathode circuit of the triode C, which electromotive force varies proportionally with the speed of rotation of motor 15 and is of polarity depending upon the direction of rotation of the motor.

This electromotive force for preventing hunting of motor 15 is induced in the motor windings 70 and 71 as a result of transformer action between the windings 70 and 71 and the winding 72. When rotor 15a is stationary, no lines of the magnetic flux set up by winding 72 link any turns of windings 70 and 71 since as illustrated in Fig. 2, the field poles on which the windings 70 and 71 are wound are displaced 90° with respect to the field poles on which winding 72 is wound and hence the electromotive force induced in windings 70 and 71 by transformer action will be zero. On rotation of rotor 15a, however, the magnetic flux set up by winding 72 will be distorted and some lines of flux will link the windings 70 and 71 to cause the induction of an electromotive force therein. It is noted the magnitude of this electromotive force is enhanced by the provision of condenser 75 connected as shown. The magnetic flux set up by winding 72 is distorted in one direction or the other depending upon the direction of rotation of rotor 15a and the extent of distortion is dependent upon the speed of rotation of said rotor. Thus, the phase of the electromotive force induced in the windings 70 and 71 is determined by the direction of rotation of motor 15 and the amplitude of said electromotive force is dependent upon the speed of rotation of said motor. Thus, by providing the conductor 76 connected as shown, a voltage is impressed across resistance 68 as the motor gains speed, the magnitude of which voltage varies proportionally with the motor speed and the phase of which is determined by the direction of rotation of the motor. As the motor gains speed, this voltage becomes effective to render the signal impressed between the control grid 41 and cathode 39 of valve 33 by the triode B ineffective to control the conductivity of the triode C, and since the voltage impressed on resistance 68 by conductor 76 is in opposition to the voltage impressed on the control grid 41 by the triode B, the energization of motor 15 will be interrupted. As the motor speed subsequently falls off, the voltage fed back across resistance 68 diminishes and as a result, the motor energization is again increased. This action continues until the potentiometer network 5 is rebalanced and permits the motor to be extremely fast in its action without overshooting taking place. It is noted that the degree of damping obtained may be varied by adjustment of resistance 77.

It will be apparent the motor 15 may be employed to operate a control valve for controlling the supply of heating agent to the furnace 1 to the temperature of which the thermocouple 2 is responsive or another motor desirably operated together with the motor 15 may be so employed. For example, as shown in Fig. 3, the furnace 1 to the heat of which the thermocouple 2 is responsive is heated by a resistance 78 which is connected to electrical supply conductors L³ and L⁴ through a rheostat 79, the adjustment of which is effected by a motor 80. The motor 80 may be exactly like motor 15 and is connected in parallel therewith. The mechanical connection of the rheostat 79 to the motor 80 is such as to increase and decrease the supply of electrical current to the resistance 78 as the temperature to which the thermocouple 2 is responsive drops below or rises above a predetermined level.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. The combination with an electrical network having an electrical characteristic to be regulated of an automatic regulator therefor including a device responsive to changes in said characteristic from a predetermined state and a rotating field motor, said motor having a winding permanently connected to said device, impedance means connected in said network adapted to be varied by said motor to restore said electrical characteristic to said predetermined state on departure therefrom, and means for arresting the network regulation substantially at a desired point including an electrical conductor having only a fixed resistance therein connected between said winding and said network.

2. The combination with an electrical network having an electrical characteristic to be regulated of an automatic regulator therefor including a device responsive to changes in said characteristic from a predetermined state and a rotating field motor, said motor having a winding permanently connected to said device and a winding continuously energized from an electrical current supply source, impedance means connected in said network adapted to be varied by said motor to restore said electrical characteristic to said predetermined state on departure therefrom, and means for arresting the network regulation substantially at a desired point including an electrical conductor having only a fixed resistance therein connected between one of said windings and said network.

3. The combination with an electrical network having an electrical characteristic to be regulated of an automatic regulator therefor including a device responsive to changes in said characteristic from a predetermined state and a driving motor, said motor having a rotatable armature and a winding connected to said device, impedance means connected in said network adapted to be varied by said motor to restore said electrical characteristic to said predetermined state on departure therefrom, means for establishing a magnetic field in said motor which field does not normally link the turns of said winding to any substantial extent when said armature is stationary, but is adapted to be distorted on rotation of said armature to cause the induction of an electromotive force in said winding, and means for arresting the network regulation substantially at a desired point including an electrical conductor having only a fixed resistance therein, applying said electromotive force to control said device.

4. A system comprising an electrical network, means for producing an unbalanced electromotive force in said network, a device adjustable to reduce said unbalanced electromotive force, a motor for adjusting said device, said motor having a winding, a detector responsive to said unbalanced electromotive force and controlling the selective energization of said winding, means for establishing a magnetic field in said motor which field does not normally link the turns of said winding to any substantial extent but is adapted to be distorted on rotation of said motor to cause the induction of an electromotive force in said winding, and means for arresting the operation of said motor at a desired point including an electrical conductor having only a fixed resistance therein opposing said induced electromotive force to said unbalanced electromotive force.

5. A system comprising an electrical network, means for producing an unbalanced electromotive force in said network, a device adjustable to reduce said unbalanced electromotive force, a motor for adjusting said device, said motor having at least two windings, a detector responsive to said unbalanced electromotive force and controlling the selective energization of one of said windings, means for energizing the other of said windings to establish a magnetic field in said motor which field does not normally link the turns of said first-mentioned winding to any substantial extent but is adapted to be distorted on rotation of said motor to cause the induction of an electromotive force in said first mentioned winding, and means for arresting the operation of said motor at a desired point including an electrical conductor having only a fixed resistance therein opposing said induced electromotive force to said unbalanced electromotive force.

6. A system comprising an electrical network, means for producing an unbalanced electromotive force in said network, a device adjustable to reduce said unbalanced electromotive force, a rotating field motor for adjusting said device, said motor having a pair of windings, an electronic device having an input circuit and an output circuit and responsive to said unbalanced electromotive force to control the energization of said windings to produce rotation of said motor in one direction, a control circuit controlling the energization of said windings to produce rotation of said motor in the opposite direction, said windings being permanently connected in the output circuit of said electronic device and to said control device, and means controlling said electronic device to arrest the operation of said motor at a desired point, said last mentioned means including an electrical connection from one of said windings to the input circuit of said electronic device.

7. A system comprising an electrical network, means for producing an unbalanced electromotive force in said network, a device adjustable to reduce said unbalanced electromotive force, a rotating field motor for adjusting said device, said motor having a pair of windings, an electronic device having an input circuit and an output circuit and responsive to said unbalanced electromotive force to control the energization of said windings to produce rotation of said motor in one direction, a control circuit controlling the energization of said windings to produce rotation of said motor in the opposite direction, said windings being permanently connected in the output circuit of said electronic device and to said control device, and means controlling said electronic device to arrest the operation of said motor at a desired point, said last mentioned means including an electrical connection from one of said windings to an intermediate point in said electronic device.

8. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and an electrical connection from the input circuit of said electronic device to said first mentioned winding.

9. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from the input circuit of said electronic device to said first mentioned winding.

10. A system comprising an electrical network, means for producing an unbalanced electromotive force, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from the input circuit of said electronic device to said first mentioned winding, said electrical connection having a resistance connected therein.

11. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from the input circuit of said electronic device to said first mentioned winding to produce an electromotive force proportional to the motor speed and in opposition to the said unbalanced electromotive force.

12. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from the input circuit of said electronic device to said first mentioned winding to produce an electromotive force proportional to the motor speed and in opposition to the said unbalanced electromotive force, said electrical connection having a resistance connected therein.

13. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from an intermediate point in said electronic device to said first mentioned winding.

14. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from an intermediate point in said electronic device to said first mentioned winding, said electrical connection having a resistance inserted therein.

15. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from an intermediate point in said electronic device to said first mentioned winding to produce an electromotive force proportional to the motor speed and in opposition to the amplified quantity of said unbalanced electromotive force.

16. A system comprising an electrical network, means for producing an unbalanced electromotive force in said network, a device adjustable to reduce said unbalanced electromotive force, a motor for adjusting said device, said motor having a pair of windings, an electronic device having an input circuit and an output circuit and responsive to said unbalanced electromotive force, a control circuit including one of said windings, a connection from the output circuit of said electronic device to the other of said windings, and means to arrest the operation of said motor at a desired point including an electrical connection from an intermediate point in said electronic device to said first mentioned winding to produce an electromotive force proportional to the motor speed and in opposition to the amplified quantity of said unbalanced electromotive force, said electrical connection having a resistance inserted therein.

FREDERICK W. SIDE.